No. 701,633. Patented June 3, 1902.
R. G. SMALL.
DIFFERENTIAL GEARING.
(Application filed Dec. 30, 1901.)
(No Model.)
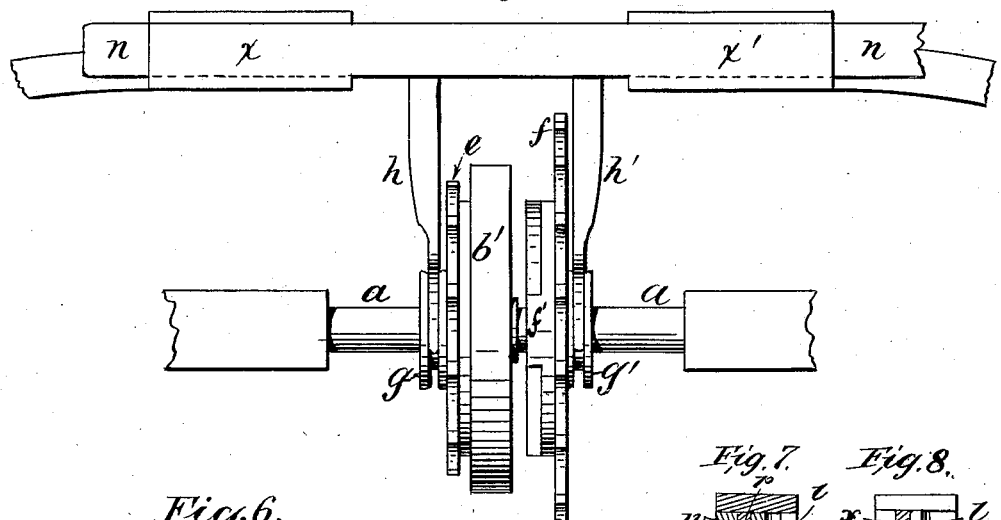
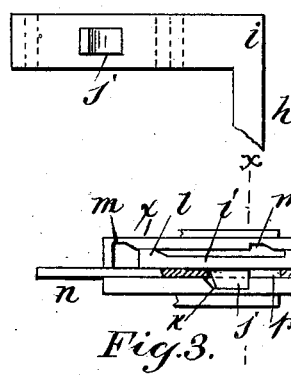
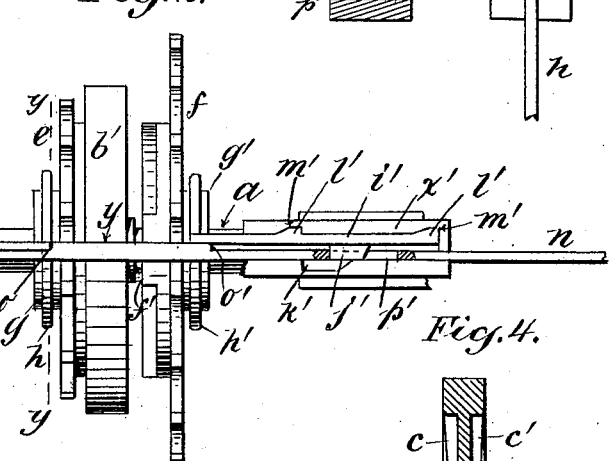
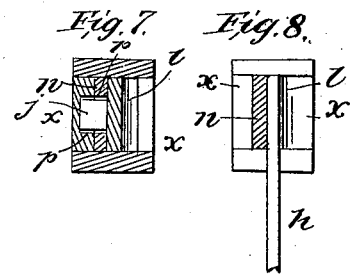
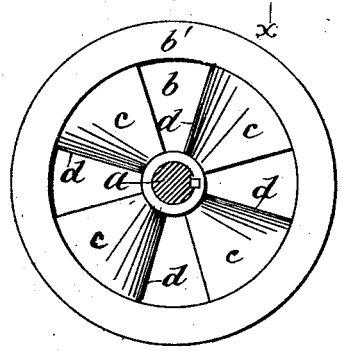
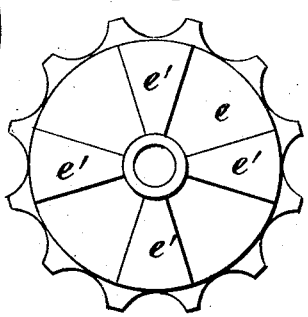
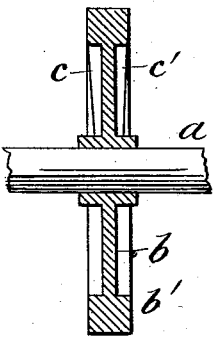
Witnesses:
D. W. Gardner.
M. Fisher
Inventor:
Roscoe G. Small
by Frederic Carragan
Atty.
THE NORRIS PETERS CO., PHOTO-LITHO., WASHINGTON, D. C.

000 # UNITED STATES PATENT OFFICE.

ROSCOE G. SMALL, OF BAYONNE, NEW JERSEY.

DIFFERENTIAL GEARING.

SPECIFICATION forming part of Letters Patent No. 701,633, dated June 3, 1902.

Application filed December 30, 1901. Serial No. 87,661. (No model.)

*To all whom it may concern:*

Be it known that I, ROSCOE G. SMALL, a citizen of the United States, and a resident of Bayonne, in the county of Hudson and State of New Jersey, have invented certain new and useful Improvements in Differential Gearing, of which the following is a specification.

This invention relates to certain new and useful improvements in differential gearing, and is particularly, though not exclusively, adapted for use on motor-vehicles, having for its object the production of a simple and economical device whereby a high gear may be normally used to propel the vehicle, and at the will of the operator a low gear may be instantaneously substituted, thus enabling the vehicle to readily ascend heavy grades.

To these ends, therefore, my said invention consists in a clutch device affixed to the axle of the vehicle, in oppositely-arranged sprocket-wheels of different diameters adapted to separately engage said clutch, and in mechanism for moving said sprocket-wheels into and out of engagement with said clutch, as well as in the details of construction and the arrangement and combination of parts, all as hereinafter more fully described and pointed out in the claims.

In the accompanying drawings, illustrating my invention, in the several figures of which like parts are designated by similar letters of reference, Figure 1 is an elevation of my invention; Fig. 2, a top view thereof. Fig. 3 is an elevation of the left face of the clutch device; Fig. 4, a vertical sectional view thereof. Fig. 5 is an elevation of the inner face of one of the sprocket-wheels, and Fig. 6 is a fragmentary rear view of one of the gear-shifting levers. Fig. 7 is an enlarged vertical transverse section taken on the lines $x\ x$ of Fig. 2, and Fig. 8 is a similar view taken on the line $y\ y$, Fig. 2.

$a$ is the axle of the vehicle, having keyed thereto the clutch device, which comprises a disk $b$, having the raised rim or periphery $b'$ and the sectoral wings $c\ c'$ on each face. These wings, as shown particularly in Fig. 3, have inclined faces projecting at their forward radii $d$, but slightly above the disk $b$ and taper to the level of the rim or periphery $b'$ at the rear.

Mounted loosely upon the shaft $a$ and at opposite sides of the clutch device are the two sprocket-wheels $e$ and $f$ of such respective diameter and bearing as many teeth respectively as may be desired. Each of said sprockets has on its inner face a disk bearing the projecting sectoral wings $e'\ f'$, adapted to enter the spaces between the wings $c\ c'$ of the clutch mechanism and by engagement therewith to propel the vehicle. On the outer faces of each of the said sprockets $e$ and $f$ are the collars or hubs $g\ g'$, each having an annular groove in which fit the bifurcated ends of the shifting arms or levers $h\ h'$. Said shifting arms or levers have the preferably integral right-angled upper horizontal members or arms $i\ i'$, which project outwardly in opposite directions, as shown in Fig. 2, the free ends thereof being contained in the bearings $x\ x'$. On the rear face of each of said angular or horizontal members or arms $i\ i'$ is a latch or lug $j\ j'$, beveled on the outer face and working in similarly-beveled but slightly-enlarged recesses $k\ k'$ in the rear walls of the bearings $x\ x'$, and on the front face of each of said angular or horizontal arms $i\ i'$ are the two smaller latches or lugs $l\ l\ l'\ l'$, beveled on their inner faces, as shown in Fig. 2, and adapted to enter the similarly-shaped recesses $m\ m\ m'\ m'$ in the front walls of the bearings $x\ x'$.

$n$ is an operating-lever suitably connected in any usual and ordinary manner to be manipulated from the front of the vehicle by the foot or by a hand-lever and is provided with a central broad or thickened portion $y$, having the shoulders $o\ o'$, and the thinner portions of said lever $n$ have the elongated longitudinal slots $p\ p'$, through which project the latches $j\ j'$ on the rear faces of the horizontal arms or members $i\ i'$. Said operating-lever is mounted parallel with the angular or horizontal arms $i\ i'$ and slides transversely through guide-openings in the end walls of the bearings $x\ x'$.

As shown in Fig. 2, the smaller sprocket-wheel constituting the high or speed gear is in use and the low-gear wheel is locked in its neutral position by the interposition of the broad or thickened portion $y$ of the operating-lever $n$ behind the inner end of the horizontal arm $i'$, and by reason of the engagement of the latch $j'$ with the end of the slot $p'$ in said arm preventing the leftward movement of said horizontal arm $i'$ with its integral gear-shifting lever $h'$ and the low-gear wheel $f$.

When it is desired to substitute the low for the high gear, the operating-lever $n$ is moved to the left, and as its shoulder $o$ is, as shown, in contact with the inner end of the horizontal arm or member $i$ of the gear-shifting lever $h$ said movement shoves said horizontal arm $i$ and its integral gear-shifting lever $h$ also to the left, carrying with it the high-speed sprocket-wheel $e$ out of engagement with the clutch-wings $c$ and rendering said sprocket-wheel "idle." Obviously the leftward movement of the lever $n$ will cause the latches or beveled lugs $k$ $l$ $l$ on the front and rear faces of the horizontal arm or member $i$ to slide along the bevels of their respective recesses $k$ $m$ $m$, carrying said horizontal arm $i$ and its integral lever $h$ forwardly until the latches or lugs $l$ $l$ on the front face of said horizontal arm $i$ are seated in their recesses $m$ $m$ in the front wall of the bearing $x$. At this point the inner end of said horizontal arm $i$ loses its engagement with the shoulder $o$ of the operating-lever $n$, and upon the further movement of said lever to the left its broad or thickened portion $y$ slides behind the horizontal arm $i$ into the position illustrated at the right of Fig. 2, in which the low-gear-shifting mechanism was at the beginning of the operation, locking said arm $i$ in its forward position, with its forward lugs $l$ $l$ tightly confined in their recesses $m$ $m$, thus preventing the accidental engagement of the sprocket-wheel $e$ with the clutch device, as just described with reference to the low-gear-shifting mechanism.

As the operating-lever $n$ is moved to the left its broad portion $y$ is moved out of engagement with the rear face of the low-gear horizontal arm $i'$, and the outer end of the slot $p'$ in said lever is brought into contact with the outer face of the rearward latch $j'$ on said horizontal arm $i'$, the continued leftward movement of said lever causing the beveled faces of the latches or lugs $j'$ $l'$ $l'$ on said arm to slide on the corresponding bevels of their recesses $k'$ $m'$ $m'$, carrying rearwardly and to the left said horizontal arm $i'$ and its integral gear-shifting lever $h'$, thus moving the low-gear wheel $f$ to the left until its wings $f'$ are in engagement with the wings $c'$ of the clutch device.

Should the wings $f'$ not be in direct alinement with the spaces between the wings $c'$ of the clutch, they will, nevertheless, be instantly guided to their seats by striking upon and gliding over the inclined faces of said wings $c'$, and when in proper position the slight projection of said wings $c'$ at $d$ is sufficient to be engaged when it is desired to back the vehicle.

By the use of my invention a lower-speed engine or motor may be used than heretofore and the same speed be maintained by the vehicle on ordinary roads and grades, or with the engines and motors now employed a higher speed may be acquired by the vehicle through the use of the high-speed gear. Again, the lateral movement of the sprocket-wheels $e$ and $f$ is very slight, and the alinement of the chains between them and the forward sprockets is never greatly disturbed, thus preventing the tendency of said chains to slip or work off and enabling the use of a tighter chain than if the lateral movement was greater. Moreover, when the operating-lever $n$ is but half thrown both of the sprockets $e$ and $f$ are out of engagement with the clutch, and when one is engaged the other is positively locked out of position.

Obviously many changes and alterations may be made in the details of construction and the arrangement of the parts, and mechanical equivalents may be substituted for any of the mechanism herein shown and described without departing from the principle and scope of my invention and involving only a mechanic's skill.

What I claim as new, and desire to secure by Letters Patent, is—

1. A rotary vehicle-axle; a disk provided on its opposite faces with clutch devices keyed to said axle; gears of different diameter mounted at opposite sides of said disk and adapted to be separately but not simultaneously engaged by the clutch devices thereof, and means for moving said gears into and out of such engagement, substantially as described.

2. A disk provided on its opposite faces with clutch devices and mounted upon the shaft of a vehicle; opposite faces with clutch devices, mounted thereon; gears of different diameter mounted at opposite sides of said disk and adapted to be separately engaged by the clutch devices thereof, and means for moving said gears into and out of such engagement, substantially as described.

3. A vehicle-axle, a disk provided on the opposite faces with clutch devices, mounted thereon; oppositely-arranged sprocket-wheels of different diameters adapted to be separately engaged by the clutch devices of said disk; levers and arms adapted to move said sprocket-wheels into and out of such engagement, and means for locking the disengaged sprocket out of position, substantially as described.

4. A clutch device comprising a disk having on its opposite faces inclined sectoral wings; a large and a small sprocket-wheel mounted at opposite sides of said clutch and provided with projecting sectoral wings adapted to enter the spaces between the wings of said clutch; a shifting lever controlling each of said sprocket-wheels and an operating-lever controlling said shifting levers, substantially as described.

5. A clutch device; a large and a small sprocket-wheel adapted to be separately engaged therewith; a shifting lever from each of said sprocket-wheels terminating in angular arms, and an operating-lever parallel with said arms adapted to move said shifting levers and arms, substantially as described.

6. A clutch device; a large and a small sprocket-wheel adapted to be separately engaged therewith; a shifting lever from each of said sprocket-wheels terminating in angular arms; and an operating-lever parallel with said arms and acting thereon to shift said sprockets into and out of engagement with the clutch, substantially as described.

7. A clutch device; a large and a small sprocket-wheel adapted to be separately engaged therewith; a shifting lever from each of said sprocket-wheels, terminating in horizontal arms partially inclosed in suitable bearings and provided on one face with a latch or beveled lug working in similarly-shaped recesses in said bearings, and an operating-lever having longitudinal slots through which said latches project, substantially as described.

8. A clutch device; a large and a small sprocket-wheel; a shifting lever from each of said wheels terminating in horizontal arms partially inclosed in bearings and provided on one face with a latch or beveled lug adapted to engage similarly-shaped recesses in said bearings, and an operating-lever having abrupt shoulders, and elongated slots, through the latter of which said latches are adapted to project, substantially as described.

9. A clutch device; a large and a small sprocket-wheel; a shifting lever from each wheel terminating in horizontal arms, partially inclosed in bearings and provided on their opposite faces with latches or beveled lugs adapted to engage similarly-shaped recesses in the front and rear walls of the bearings; and an operating-lever having abrupt shoulders adapted to engage the inner ends of said horizontal arms, and provided with elongated slots through which the latches on one face thereof may project, substantially as described.

Signed at New York, in the county of New York and State of New York, this 28th day of December, A. D. 1901.

ROSCOE G. SMALL.

Witnesses:
JNO. N. RALSTON,
FREDERIC CARRAGAN.